(12) United States Patent
Bader et al.

(10) Patent No.: US 8,920,703 B2
(45) Date of Patent: Dec. 30, 2014

(54) METHOD FOR FILLING AT LEAST ONE CAVITY

(75) Inventors: Christopherus Bader, Neftenbach (CH); Guido Schildknecht, Wil (CH)

(73) Assignee: Priamus System Technologies AG, Schaffhausen (CH)

( * ) Notice: Subject to any disclaimer, the term of this patent is extended or adjusted under 35 U.S.C. 154(b) by 347 days.

(21) Appl. No.: 11/630,873

(22) PCT Filed: Jun. 23, 2005

(86) PCT No.: PCT/EP2005/006796
§ 371 (c)(1),
(2), (4) Date: Dec. 22, 2006

(87) PCT Pub. No.: WO2006/000411
PCT Pub. Date: Jan. 5, 2006

(65) Prior Publication Data
US 2009/0179350 A1    Jul. 16, 2009

(30) Foreign Application Priority Data
Jun. 29, 2004   (DE) .......................... 10 2004 031 546

(51) Int. Cl.
| | | |
|---|---|---|
| B29C 45/00 | (2006.01) |
| B29C 45/76 | (2006.01) |
| B29C 45/78 | (2006.01) |
| B29C 45/26 | (2006.01) |
| B29C 45/27 | (2006.01) |
| B29C 45/77 | (2006.01) |

(52) U.S. Cl.
CPC ....... *B29C 45/76* (2013.01); *B29C 2945/76739* (2013.01); *B29C 2945/76076* (2013.01); *B29C 2945/76545* (2013.01); *B29C 45/78* (2013.01); *B29C 2045/0032* (2013.01); *B29C 2945/7626* (2013.01); *B29C 2945/76006* (2013.01); *B29C 2945/76056* (2013.01); *B29C 2045/2687* (2013.01); *B29C 2945/7604* (2013.01); *B29C 2945/76257* (2013.01); *B29C 2045/2722* (2013.01); *B29C 2945/76531* (2013.01); *B29C 45/77* (2013.01)
USPC ........................ 264/328.8; 264/40.1; 264/40.7

(58) Field of Classification Search
CPC ............. B29C 2045/0032; B29C 2945/76538; B29C 45/76; B29C 45/762; B29C 45/7693; B29C 45/78
USPC ..................... 264/40.1, 40.7, 328.8
See application file for complete search history.

(56) References Cited

U.S. PATENT DOCUMENTS

| 3,799,494 A | * | 3/1974 | McLean, Jr. ................. 249/119 |
| 5,223,275 A | * | 6/1993 | Gellert .......................... 425/130 |

(Continued)

FOREIGN PATENT DOCUMENTS

| DE | 101 12 126 | 12/2002 |
| DE | 101 16 998 | 12/2002 |

(Continued)

*Primary Examiner* — Amjad Abraham
(74) *Attorney, Agent, or Firm* — Bachman & LaPointe, P.C.

(57) ABSTRACT

A method for filling at least one cavity of a tool for producing a preform from a melted mass, specifically a cavity of a tool in an injection molding machine, the melted mass being introduced into the cavity under pressure from a plurality of nozzles. According to the method, a sensor is associated with at least one nozzle, the sensor determining the flow of melted mass in the cavity, and the filling process through the nozzles is automatically co-ordinated on the basis of the signals of the sensor.

4 Claims, 3 Drawing Sheets

(56) References Cited

U.S. PATENT DOCUMENTS

| | | | |
|---|---|---|---|
| 5,556,582 A * | 9/1996 | Kazmer | 264/40.1 |
| 5,762,855 A * | 6/1998 | Betters et al. | 264/328.8 |
| 6,030,573 A * | 2/2000 | Matsumoto et al. | 264/511 |
| 6,090,318 A * | 7/2000 | Bader et al. | 264/40.1 |
| 2003/0203064 A1 * | 10/2003 | Doughty et al. | 425/145 |
| 2004/0076702 A1 * | 4/2004 | Werfeli | 425/144 |
| 2004/0113303 A1 * | 6/2004 | Frey | 264/40.6 |
| 2004/0135277 A1 * | 7/2004 | Frey | 264/40.5 |

FOREIGN PATENT DOCUMENTS

| | | |
|---|---|---|
| EP | 0 704 290 | 4/1996 |
| JP | 2001-179786 | 7/2001 |

* cited by examiner

METHOD FOR FILLING AT LEAST ONE CAVITY

BACKGROUND OF THE INVENTION

The invention relates to a method for filling at least one cavity of a die for the production of a molding from a melt, in particular a cavity of a die in an injection molding machine, the melt being introduced under pressure out of nozzles through a plurality of cutouts into the cavity, which nozzles are assigned sensors which determine the melt stream in the cavity.

In injection molding or, for example, also in diecasting, the cavity in a die is filled with a melt, in particular consisting of plastic, metal or ceramic. This introduction operation takes place until the cavity is at least almost completely filled, this being followed by a changeover to what is known as the holding pressure phase, in which, above all, a contraction of the material in the cavity is also compensated.

DE 101 12 126 A1 discloses a method for the automatic balancing of the volumetric filling of cavities, in particular in multiple injection molding dies, the temperature profile in the cavities being determined and being equalized for other cavities.

DE 101 16 998 A1 (WO 02/08117A), for example, describes how a cavity is detected automatically with the aid of a die wall temperature sensor at the end of the flow path of a cavity, when the plastic melt reaches this point. At this moment, a signal is sent to the machine control, in order to change over from a speed-regulated injection operation to a pressure-controlled holding pressure operation. This publication also indicates the problems in a single die with multiple tie-up for the production of very large injection moldings with long flow paths, of regulating the flow front of the melt up to volumetric filling with the aid of sensors in the cavity, such that the hot duct nozzles can be controlled according to the programming at each injection point.

Furthermore, from JP 2001 179786 A, a method may be gathered, in which melt is introduced out of the nozzle via a distributor through two injection points into a cavity. This cavity is assigned two pressure sensors in the melt path, the opening and closing of corresponding valves upstream of the injection points being regulated on the basis of the signals from said pressure sensors.

Again, from EP 0 704 290 A, a method for the production of plastic injection moldings may be gathered, in which melt is led to a plurality of injection points via a distributor. From a first injection point, a specific quantity of melt is introduced into the cavity and is distributed as a result of the closing of the mold, until the melt reaches a sensor. Thereafter, a second injection point is opened and, again, part of the melt is introduced into the mold and distributed as a result of the further closing of the mold, until a second sensor is activated.

For large-area or large-volume moldings, such as, for example, bumpers, door battens, fittings or the like, cascade injection molding, as it is referred to, is known. Here, injection or filling is not carried out, as in the conventional injection molding method via a central gate, but sequentially via a plurality of controlled nozzles. That is to say, first, only part of the die cavity is filled by the first nozzle. When the melt reaches the position of the second nozzle, the latter opens and fills a further part of the cavity, etc. The optimization of the nozzle opening takes place, as a rule, empirically, there being no possibility of checking the position of the weld lines, that is to say the local meeting of the various melts. This has a decisive influence on the quality of the parts produced.

In general, it is to be noted that, in these applications, because of the long flow paths, fluctuations in the filling of a cavity have a substantially greater effect than where comparatively small moldings are concerned.

The object on which the present invention is based is to improve the cascade injection molding process appreciably.

SUMMARY OF THE INVENTION

To achieve this object, on the basis of the signals from the sensors, continuous introduction operations by the nozzles are coordinated one after the other automatically with one another by means of the time difference in the signals from the sensors.

This means that, at present, the nozzles are no longer switched on empirically, but on the basis of the melt flow determined. According to the invention, in this case, any parameter which is varied by the melt can be detected. Such parameters are the temperature or temperature changes which are caused by the melt. If the melt itself impinges onto a temperature sensor, it can cause the temperature of the latter to rise immediately, which may lead to a signal which, in turn, means that the melt has reached this temperature sensor.

Nowadays, however, not only the melt temperature itself is measured, but, preferably, the die wall temperature, as described in the abovementioned DE 101 12 126 A1.

The use of pressure sensors may also be envisaged, since the inflowing melt normally increases the pressure in the cavity. However, the melt front cannot be determined very accurately by this means.

Sensors could also be conceivable which react to a specific material of the melt, for example to a specific metal. Preferably, however, temperature sensors are used, as before.

According to the invention, then, each nozzle is assigned a sensor of this type which detects when the melt reaches the corresponding position. In this way, the individual nozzles can be opened or closed as a function of the process, that is to say in a closed control loop. An appreciable improvement in the quality of the moldings is thereby achieved, since the meeting of the various melts ("weld line") no longer happens arbitrarily, but is controlled.

In principle, there is the possibility of positioning the sensors, in particular the temperature sensors, upstream of the nozzles or downstream of the nozzles. Positioning the sensors upstream of the nozzles has the advantage that the opening of the nozzles can be delayed and controlled via a time control. Positioning of the sensors downstream of the nozzles has the effect that, in actual fact, opening only ever occurs when the melt also actually flows over the sensor. This, although corresponding to the ideal situation, can no longer be influenced at a later stage.

Preferably, a last sensor is placed at the end of the flow path. When the melt reaches this last sensor, all the nozzles are opened and changed over to holding pressure.

Whereas, with the first method described, the meeting of the various melt streams is regulated, by means of a further method the speed of the melt between two gates/nozzles is regulated and standardized. This is desirable inasmuch as the plastic part has the same properties in terms of contraction and distortion if it has also been produced under the same filling conditions.

According to the invention, the die wall temperatures in the vicinity of this nozzle are then measured, analyzed and, if appropriate, regulated, so that, if the machine setting is unchanged, the melt always covers the distance between two hot duct nozzles or two sensor positions in the same time. The flow speed of the melt is preferably varied in that the viscosity of the melt is varied. This preferably takes place in that the melt is thermally controlled differently at the gates/nozzles. The addition of melt of different viscosity is, of course, also possible, but signifies a considerable outlay.

Each segment between two hot duct nozzles must therefore be considered with a view to independent regulation.

It has been shown, in practice, however, that it is not sufficient to standardize the melt front speed between two hot duct nozzles individually, but that there is a dependence between the individual segments. Here, however, a distinction must be made between a single-cavity die and a multiple-cavity die.

In the simplest instance of a single-cavity die, for example for a bumper, the filling phases of the individual segments are initially optimized. This takes place by the optimized opening and closing of the sealing nozzles either automatically with the aid of the abovementioned method or empirically. After optimization, the temperatures measured in the vicinity of the hot duct nozzles are stored as reference curves.

If, then, the flow behavior of the melt varies during production on account of external influences, this behavior fluctuates from the first gate as far as the end of the flow path. That is to say, the time difference between the reference curve and the current temperature curve becomes increasingly greater, the further in the direction of the end of the flow path the measurement is made.

In the case of a multiple-cavity die, for example in the production of two identical side battens of a vehicle in the same die, the aim is not to regulate each individual part with respect to a reference signal, but in comparison with one another. That is to say, the melt flow in both parts must be standardized, so that the melt is at the same distance from the respective gate at each time point.

Since, in this case, two measurement curves are compared with one another or standardized, in the event of a signal rise with a time offset a reference point between the two curves is determined, which is used as a reference point for regulation. Instead of a reference point, in principle, a reference curve could also be determined, but, for the sake of simplicity, a reference point is selected.

BRIEF DESCRIPTION OF THE DRAWINGS

Further advantages, features and details of the invention may be gathered from the following description of preferred exemplary embodiments and with reference to the drawing in which.

DETAILED DESCRIPTION

Figure 1:
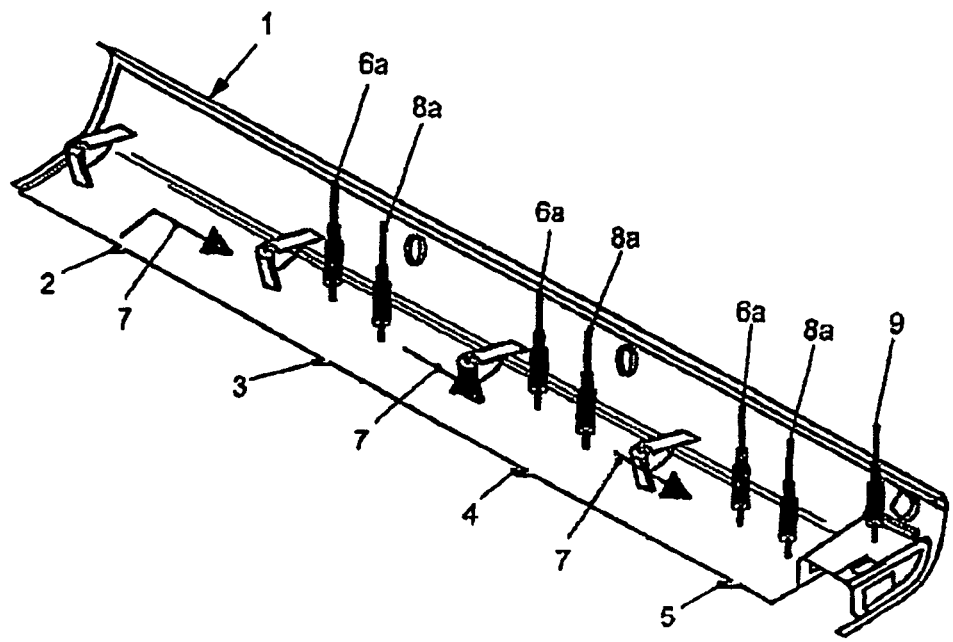
FIG. 1 shows a perspective and diagrammatic view of a large-area molding with associated feed points and sensors.

FIG. 1 illustrates in perspective a large-area molding 1 which is produced in a cavity of an injecting molding die. Four gates 2 to 5 are indicated, at which melt is introduced into the cavity. Furthermore sensors 6a are shown, which are arranged upstream of the corresponding nozzles at the gates 2 to 5 in the melt direction, which is identified by the arrows 7. By contrast, the reference numeral 8a designates sensors which are arranged downstream of the gate or the corresponding nozzles in the melt direction.

A last sensor 9 is provided near the end of the flow path of the melt.

The present invention functions as follows:

A melt is supplied to the first gate 2 via a nozzle, not shown in any more detail. It flows in the flow direction 7 and reaches the first temperature sensor 6a preceding the gate 3. This sensor sends a signal to the machine control which initiates the injection operation via the nozzle of the gate 3. The melt flows, in turn, in the melt direction 7 toward the gate 4 and there reaches the next preceding temperature sensor 6a. This, in turn, transmits a signal to the machine control which then causes melt to be filled into the cavity via the nozzle at the gate 4. This melt, too, flows in the melt direction 7 to the next sensor 6a which precedes the gate 5. This sensor 6a, in turn, transmits a signal to the machine control, with the result that melt is introduced into the cavity via the gate 5. This melt flows in the direction of the end of the cavity. Shortly before the end of the flow path, the sensor 9 detects the arrival of the melt and then changes over all the nozzles at the gates 2 to 5 to holding pressures.

There is also a possibility of placing the sensors downstream of the gates 3, 4 and 5, as indicated by the sensors 8a. Positioning the sensors 8a downstream of the nozzles has the effect that, in actual fact, only ever occurs when the melt actually also flows over the sensor. This, although corresponding to an ideal situation, means that the melt can no longer be influenced at a later stage, as is possible by the sensors 6a being positioned upstream. These have the advantage that the opening of the nozzle can be delayed and controlled via a time control.

Figure 2:
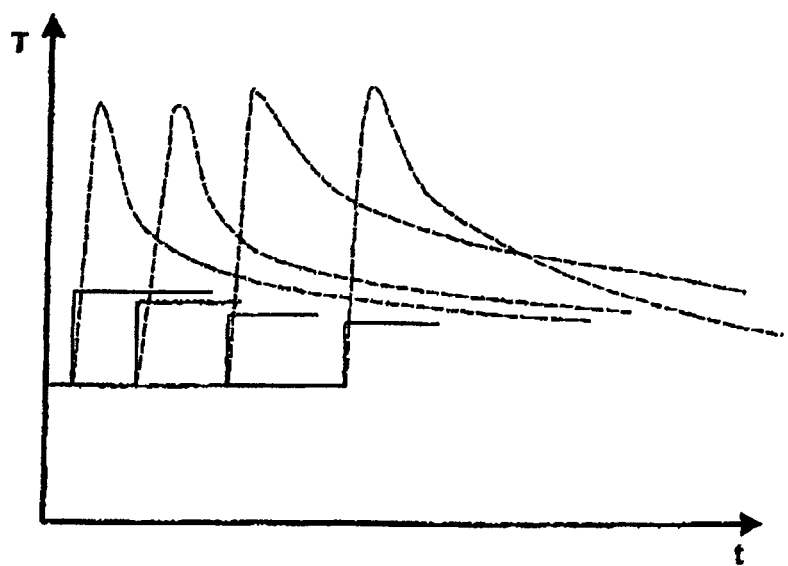
FIG. 2 shows a graph-like illustration of the control of injection nozzles.

In FIG. 2, the measurement signal from the temperature sensor is plotted in dashes and dots against the time. The unbroken lines show the switching signal "open/close nozzles".

Figure 3:
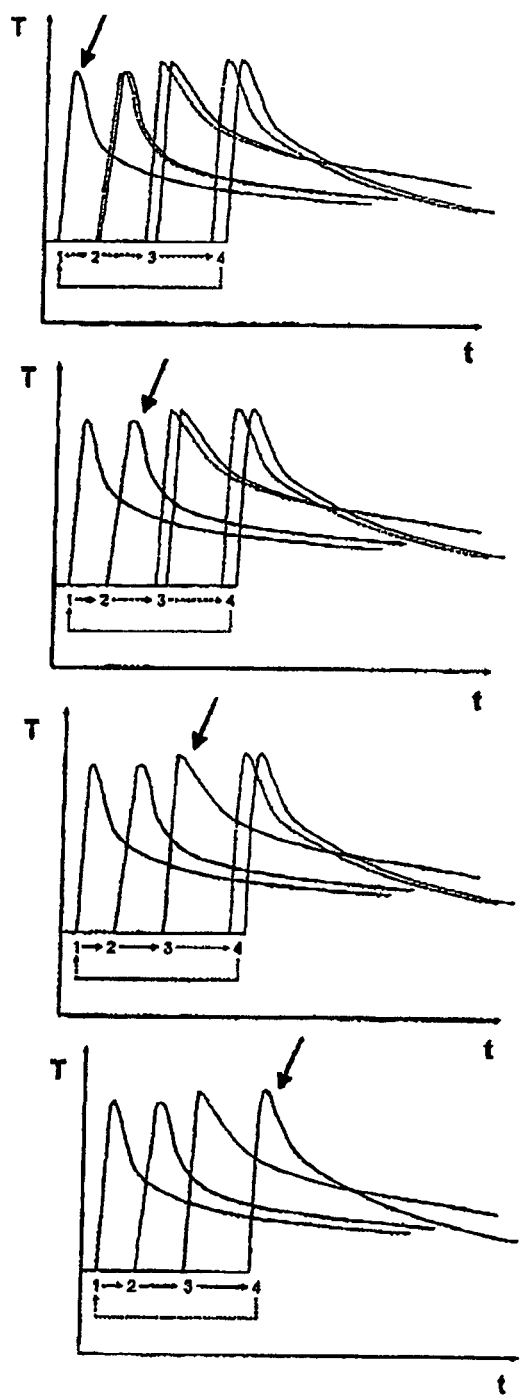
FIG. 3 shows graph-like illustrations of a regulating method according to the invention.

An essential feature according to the invention relates to the method for regulating the melt supply. It can be seen in FIG. 3 that a reference value, illustrated by dashes, coincides with the measurement signal at the first temperature sensor only. At the following temperature sensors 2, 3 and 4, the reference value deviates to a greater or lesser extent from the measurement signal.

According to the invention, one temperature sensor after the other is then regulated until the reference and the measurement value of measurement signal coincide. That is to say, first, regulation takes place at the second temperature sensor, then at the third temperature sensor and then at the fourth temperature sensor. Regulation then commences again from the outset.

If the time interval between all the references and measurement signals is smaller than a specific $\Delta t$, no further regulation takes place. If any time difference exceeds this $\Delta t$, this is immediately readjusted. In this case, it is critical that the individual segments are always checked again in the same order. There can be any number of regulated segments, depending on the number of nozzles.

Figure 4:
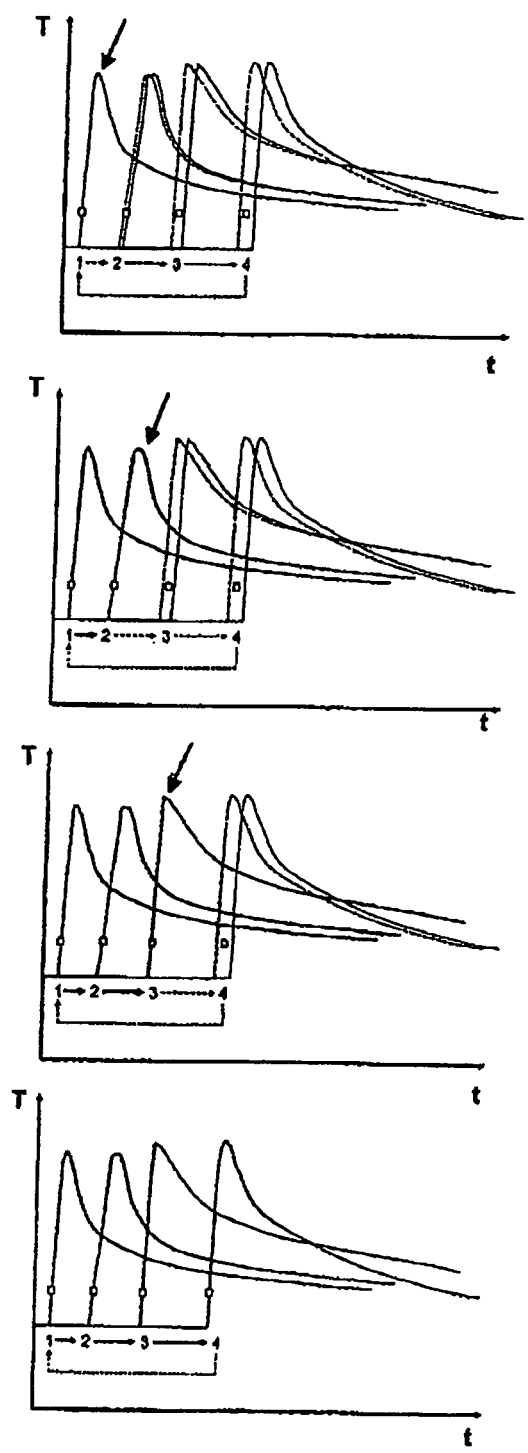
FIG. 4 shows graph-like illustrations of a further regulating method according to the invention.

FIG. 4 shows regulation for a multiple-cavity die. Where a multiple-cavity die is concerned, according to the invention, the measurement curves of the same gates are compared with one another and standardized. In the event of a signal rise with a time offset, as indicated by measurement signals of the first part which are illustrated by dashes and the measurement signals of the second part which are illustrated by unbroken lines, a reference point 10 between the two curves is determined which is varied as a reference point for regulation. Instead of a reference point, in principle, a reference curve could also be determined, but, for the sake of simplicity, a reference point is used.

Here, too, regulation takes place between the first gate and the second gate, until the two measurement curves coincide. After that, regulation between the second and the third gate takes place, and thereafter regulation between the third and the fourth gate, finally regulation between the fourth gate and the end of the flow path, until all the measurement curves coincide.

If the time interval between the measurement curves is smaller than a specific $\Delta t$, no further regulation takes place. If any time difference exceeds this $\Delta t$, this is immediately readjusted. In this case, it is critical that the individual segments are always checked again in the same order. There can be any number of regulated gates, depending on the number of hot duct nozzles.

The invention claimed is:

1. Method for filling at least one cavity of a die in an injection molding machine, comprising selectively introducing the melt under pressure into the cavity sequentially from a plurality of sequentially located nozzles, determining and equalizing flow speed of the melt, associating each of the plurality of sequentially located nozzles with a sensor located upstream of the next sequentially located nozzle or alternatively downstream of the nozzle with respect to the direction of melt flow, wherein the associated sensor of each nozzle determines the position of the melt stream in the cavity and further determines at least one of a die wall temperature and a melt temperature and generates a reference signal, and, on the basis of the reference signal from the associated sensor, the introduction of melt operation by the next sequentially located nozzle is coordinated automatically, and providing a changeover sensor near the end of the flow path of the melt wherein the sequentially located nozzles are changed over to holding pressure when the melt is sensed by the changeover sensor, further including varying the viscosity of the melt by thermally controlling the melt upstream or in the nozzles in order to equalize the flow speed, wherein the method further includes providing a multiple-cavity die wherein reference signals are generated for each cavity, and the reference signals are compared to one another and the melt flow to each cavity is standardized.

2. Method according to claim 1, wherein each of the sensors activates a plurality of sequentially located nozzles when the melt has reached a predetermined point in the cavity which is sensed by the sensors.

3. Method according to claim 1, including coordinating the activity of the nozzles and/or the viscosity of the melt with one another in the flow direction of the melt.

4. Method according to claim 1, determining at least one reference point or reference curve between the reference signals to be compared and using same as a reference point for regulation.

* * * * *